(12) United States Patent
Tao

(10) Patent No.: US 11,079,073 B2
(45) Date of Patent: Aug. 3, 2021

(54) TUBULAR SOLID STATE LIGHTING

(71) Applicant: SIGNIFY HOLDING B.V., Eindhoven (NL)

(72) Inventor: Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/754,314

(22) PCT Filed: Oct. 5, 2018

(86) PCT No.: PCT/EP2018/077089
§ 371 (c)(1),
(2) Date: Apr. 7, 2020

(87) PCT Pub. No.: WO2019/072698
PCT Pub. Date: Apr. 18, 2019

(65) Prior Publication Data
US 2020/0309328 A1    Oct. 1, 2020

(30) Foreign Application Priority Data
Oct. 10, 2017  (EP) .................................... 17195712

(51) Int. Cl.
| F21K 9/278 | (2016.01) |
| F21K 9/272 | (2016.01) |
| H05B 45/3725 | (2020.01) |
| F21V 23/00 | (2015.01) |
| F21V 23/02 | (2006.01) |
| F21Y 103/10 | (2016.01) |
| F21Y 115/10 | (2016.01) |

(52) U.S. Cl.
CPC .............. *F21K 9/278* (2016.08); *F21K 9/272* (2016.08); *F21V 23/009* (2013.01); *F21V 23/023* (2013.01); *H05B 45/3725* (2020.01); *F21Y 2103/10* (2016.08); *F21Y 2115/10* (2016.08)

(58) Field of Classification Search
None
See application file for complete search history.

(56) References Cited

U.S. PATENT DOCUMENTS

| 9,341,359 | B1 | 5/2016 | Fernandez et al. |
| 2011/0058365 | A1 | 3/2011 | Osawa |
| 2012/0147598 | A1 | 6/2012 | Ivey |
| 2013/0135850 | A1 | 5/2013 | Jheng et al. |
| 2013/0335959 | A1 | 12/2013 | Hsia et al. |
| 2014/0103824 | A1 | 4/2014 | Chen et al. |
| 2015/0049473 | A1 | 2/2015 | Pan et al. |
| 2016/0113076 | A1 | 4/2016 | Davenport et al. |
| 2016/0270162 | A1 | 9/2016 | Gulsen |

FOREIGN PATENT DOCUMENTS

| DE | 102012000973 A1 | 7/2013 |
| WO | 2011124670 A1 | 10/2011 |
| WO | 2013135527 A1 | 9/2013 |
| WO | 2015014584 A1 | 2/2015 |

*Primary Examiner* — Britt D Hanley
(74) *Attorney, Agent, or Firm* — Daniel J. Piotrowski

(57) ABSTRACT

The invention provides a tubular solid state lamp having a driver at each end each with an associated section of the solid state light source arrangement. The two drivers are for connection in series so that the mains voltage is shared between them. In this way, each end connector of the lamp holder is only required to operate at half the mains voltage so that a lower creepage distance (e.g. 2 mm) can be tolerated.

12 Claims, 3 Drawing Sheets

TUBULAR SOLID STATE LIGHTING

CROSS-REFERENCE TO PRIOR APPLICATIONS

This application is the U.S. National Phase application under 35 U.S.C. § 371 of International Application No. PCT/EP2018/077089, filed on Oct. 5, 2018, which claims the benefit of European Patent Application No. 17195712.9, filed on Oct. 10, 2017. These applications are hereby incorporated by reference herein.

FIELD OF THE INVENTION

The invention relates to a tubular solid state lighting lamps, such as a tubular LED (TLED), suitable for connection to a fluorescent ballast.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with electromagnetic or electronic ballasts for fluorescent tube lamps.

There are now tubular LED ("TLED") lamps which can be used as a direct replacement for traditional fluorescent light tubes. In this way, the advantages of solid state lighting can be obtained without the expense of changing existing light fittings. Indeed, TLEDs that are compatible with fluorescent lamp ballasts are the most straightforward and lowest cost way of replacing fluorescent lighting by LED lighting. Both rewiring (removing the ballast, connecting a TLED directly to AC mains) and replacing the whole luminaire are considerably more cumbersome and expensive. Both electromagnetic (EM) and electronic high frequency (HF) ballasts are used in fluorescent lighting. However, in recent years direct-mains type TLED are becoming popular because of low-cost and the avoidance of ballast compatibility issues.

Different tubular LED designs are required for connection to EM and HF ballasts. This invention relates in particular to TLED for EM ballasts and direct-mains TLED.

For completeness, FIG. 1 shows a typical block diagram of a TLED that is compatible with an HF fluorescent ballast.

The ballast 10 comprises a half-bridge parallel resonant converter and it drives an electronic (high frequency) ballast compatible TLED 12.

The ballast 10 and high frequency compatible TLED 12 are connected via the connection pins 1 and 2 at one end of the TLED and via the connection pins 3 and 4 at the other end of the TLED (shown on one side of the circuit diagram for simplicity). A high frequency compatible TLED 12 typically comprises some or all of the building blocks depicted in FIG. 1. These are a filament emulation unit 14, a pin safety and start-up circuit 16, a matching circuit 18, a rectifier 20, an LED driver 22, a smoothing capacitor 23 and the LED string 24.

For most of these building blocks, the implementations shown in FIG. 1 are just examples and other implementations of their functions are possible and are also used. The LED driver shown in FIG. 1 is a shunt switch driver.

The details of the design of the half-bridge ballast 10 are not shown in FIG. 1. This type of ballast is also just an example and other implementations such as push-pull converters are also possible and in use.

The TLED 12 comprises four connection pins that are used to connect it to the ballast 10. Pin 1 and pin 2 are located at one end of the TLED and pin 3 and pin 4 are located at the other end of the TLED. The filament emulation unit comprises first circuitry connecting pin 1 and pin 2 to a pin 5 and pin 3 and pin 4 to a pin 6. Pin safety and start-up circuit 16, matching circuit 18, and rectifier 20 are connected to the ballast only via pin 5 and pin 6.

As mentioned above, this invention relates in particular to tubular LEDs designed for connection to an electromagnetic ballast, as well as direct mains. In both of these cases there is the problem of a high pin voltage, which does not arise with HF ballasts.

FIG. 2 shows a typical block diagram of a TLED 30 that is compatible with an EM fluorescent ballast. The TLED 30 comprises a driver 32 which connects to the LED arrangement 34, which is in the form of an LED string.

The LED driver 32 comprises a rectifier, EMI filter, and a driver circuit (e.g., a switching mode power supply circuit, for example a Buck circuit).

The connection pins of the lamp (and the corresponding terminals of the end connectors of the luminaire housing) define a live terminal 1 at one end and a neutral terminal 3 at the other end. EM ballast compatible tubes are typically designed for single-ended input as shown in FIG. 2, namely a driver being powered by the pins at one end only. A dummy starter 38 (which is typically a fused short) is used to close the current loop between the two ends.

This connection scheme provides protection against pin leakage currents and thus provides pin safety because there is no conductive path from one end of the lamp itself to the other. Therefore, no leakage current can flow if somebody touches the pins at one end while the other end is already energized. The input power is applied to one end of the tube and the other end is provided with a fuse 36 for passing through the current to complete a circuit between external live L and neutral N connections. The glow starter in the fixture is then replaced with the dummy starter 38.

The lamp can be installed with either orientation.

The same TLED can often also be used for direct connection to the mains as shown in FIG. 3. In this case, the power is applied directly to the power-input side. The TLED in this case needs to be connected with the correct orientation.

The design can be adapted to be suitable for orientation-independent connection direct to the mains by providing a jumper wire 40 as shown in FIG. 4.

A problem is that the application of a mains voltage to the lamp holders may not be appropriate because the lamp holders are not designed to receive the mains voltage when they are instead connected through a ballast. The lamp holders for T8 and T5 lamps (which are G13 and G5 lamp holders) are manufactured to comply with the IEC 60400 standard—Lamp holders for tubular fluorescent lamps and starter holders. The standard allows for a minimum 2 mm creepage between the two metal contacts of the socket of the lamp holder.

For T8 and T5 lamps this 2 mm is sufficient because the voltage between the two pins are the filament heating voltage, which is typically below 5V rms in steady state.

Because TLEDs for mains and EM ballast applications are typically wired as a single-ended input as explained above, with the input voltage applied fully to one end of the tube (the other end being a dummy end), an issue arises because this is not an intended use of the lamp holder. The voltage between the two contacts of the lamp holder will be the mains voltage (or near the mains voltage when connected to an EM ballast). According to the IEC standard a minimum 2.5 mm creepage is then required. Therefore, there is risk of tracking (i.e. insulator breakdown and over-heating risk) if the TLED lamp is used with a holder with only 2 mm creepage distance.

There is therefore a need for a solution which can reduce the pin voltage applied to the TLED while still keeping a pin safety function.

SUMMARY OF THE INVENTION

The invention is defined by the claims.

According to examples in accordance with an aspect of the invention, there is provided a tubular solid state lamp, comprising:

a first pair of connection pins at one end and a second pair of connection pins at the other end;

a solid state light source arrangement comprising a first section and a second section;

a first driver electrically coupled to the first pair of connection pins and connected to the first section of the solid state light source arrangement for driving the first section; and a second driver electrically coupled to the second pair of connection pins and connected to the second section of the solid state light source arrangement for driving the second section.

This lamp design provides two drivers which may be connected (externally) in series so that the mains voltage is shared between them. In this way, each end connector of the lamp holder is only required to operate at half the mains voltage so that a lower, e.g. 2 mm, creepage distance can be tolerated. The maximum allowed voltage between the contacts is 194V for a 2 mm creepage distance (according to the IEC standard).

The first and second drivers and their light source arrangement sections are preferably completely isolated from each other internally within the lamp so that there is no electrical internal connection between the pins at one end and at the other. Thus, pin safety is ensured.

In one set of examples, the first and second drivers each comprise a switch mode power supply. They may for example comprise buck, boost or flyback converters. They are preferably operated with open loop control. The configuration of the invention, with two drivers in series sharing the mains input voltage, may be implemented with any known driver technology.

In another set of examples, the first and second drivers each comprise a linear driver, arranged to provide stable operation in series.

The lamp may further comprise an interconnection between one pin of the first pair of connection pins and one pin of the second pair of connection pins. This implements the series connection between the pairs of pins at each end, thereby placing the two drivers in series.

The interconnection may comprise a dummy starter. This is suitable for connection to an electromagnetic fluorescent tube ballast. Alternatively, the interconnection may comprise a shorting wire. This is suitable for direct connection to the mains.

The invention also provides a lighting installation, comprising:

a fluorescent tube lighting driver comprising an electromagnetic ballast and first and second end connectors, each end connector comprising a pair of connection terminals; and a lamp as defined above connected between the first and second end connectors.

The lamp is in this way connected to existing electromagnetic ballast.

Each end connector for example comprises a G13 or G5 lamp holder.

Each end connector for example has a creepage distance of between 2 mm and 2.5 mm.

The use of two drivers enables the voltage across the terminals of each end connector to be maintained below a maximum voltage associated with this low creepage distance, in particular below 194V.

The end connectors for example define a live terminal in one end connector and a neutral terminal in the other end connector and wherein the other two terminals are connected by a dummy starter. The dummy starter forms the series connection between the drivers, externally of the lamp so that pin safety is maintained.

The invention also provides a lighting installation, comprising:

a fluorescent tube lighting connector arrangement comprising first and second end connectors, each end connector comprising a pair of connection terminals; and a lamp as defined above connected between the first and second end connectors, wherein the end connectors define a live terminal in one end connector and a neutral terminal in the other end connector and wherein the other two terminals are connected by a shorting wire.

The lamp is in this way connected to the mains. The shorting wire forms the series connection between the drivers, externally of the lamp so that pin safety is maintained.

BRIEF DESCRIPTION OF THE DRAWINGS

Examples of the invention will now be described with reference to the accompanying drawings, in which.

DETAILED DESCRIPTION OF EMBODIMENTS

Figure 1:
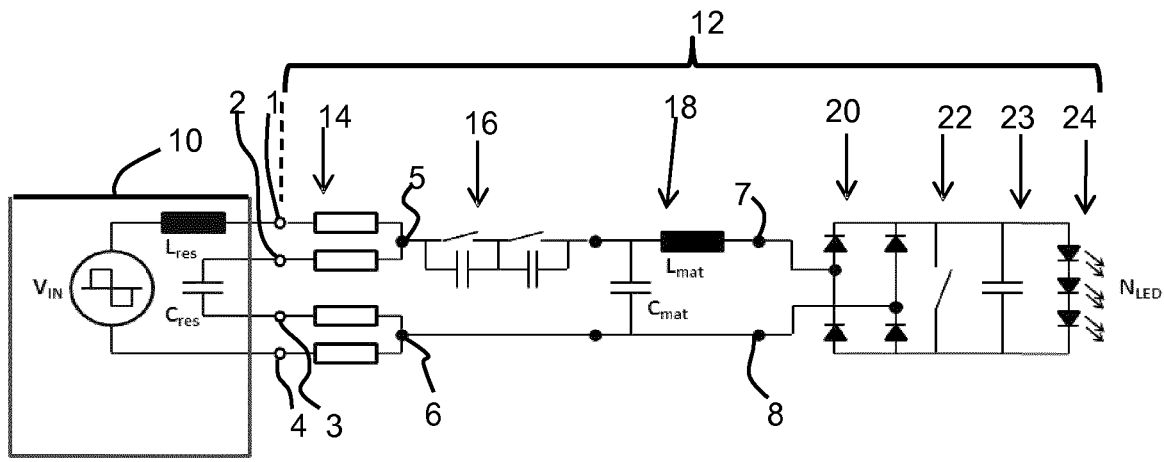
FIG. 1 shows a typical block diagram of a TLED that is compatible with an electronic fluorescent ballast.
Figure 2:
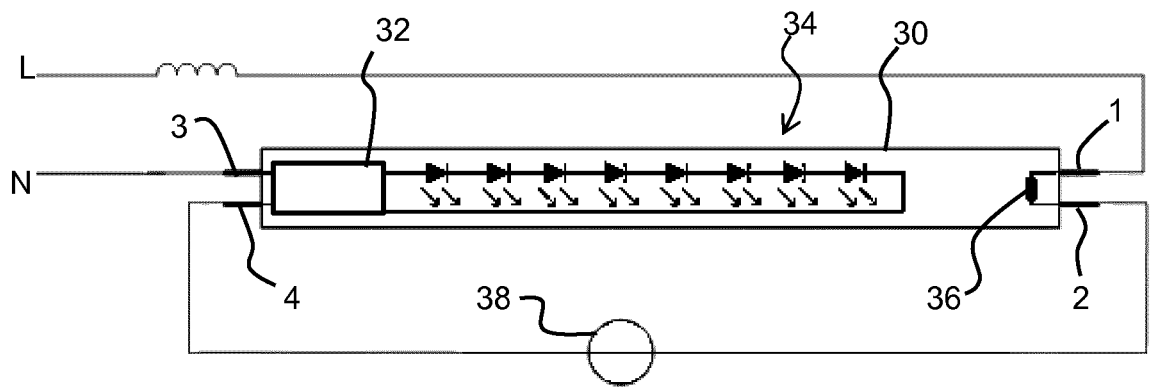
FIG. 2 shows a typical block diagram of a TLED that is compatible with an EM fluorescent ballast.
Figure 3:
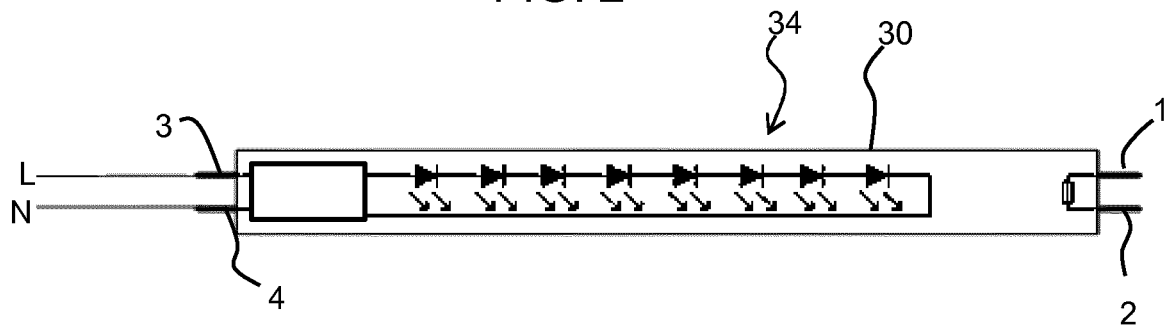
FIG. 3 shows how the lamp of FIG. 2 can also be used for direct connection to the mains.
Figure 4:
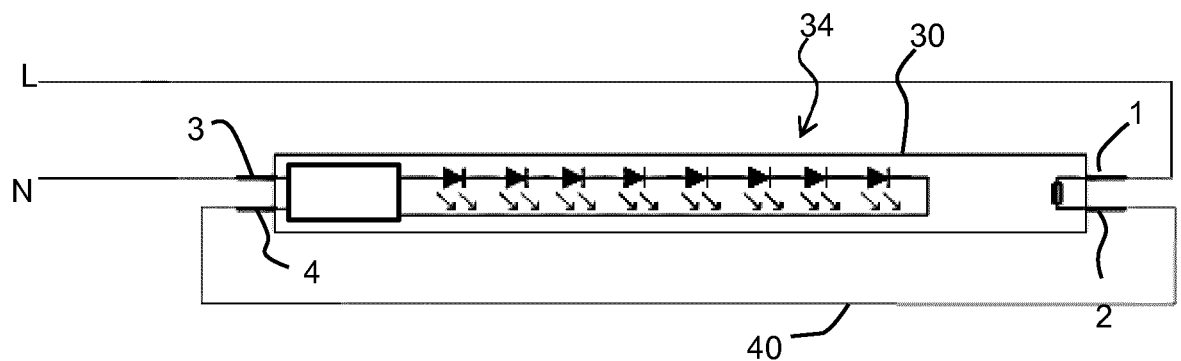
FIG. 4 shows how the lamp of FIG. 2 can be adapted to be suitable for orientation-independent connection direct to the mains.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a tubular solid state lamp having a driver at each end each with an associated section of the solid state light source arrangement. The two drivers are for connection in series so that the mains voltage is shared between them. In this way, each end connector of the lamp holder is only required to operate at about half the mains voltage so that a lower creepage distance (e.g. 2 mm) can be tolerated. These designs may be for an equal division of the mains voltage, but there may be slight deviation due to tolerances.

The invention is directed to the problem of supplying a tubular solid state lamp with the mains through an existing tubular lamp fitting.

The table below shows some driver solutions and the performance of the TLED. There is a general aim to keep ballast loss as low as possible, and there is a desire for the pin voltage to be below 194V.

| Option | Driver concepts | Pin voltage | EM ballast loss | Lamp current (120 cm) | Lamp power (120 cm) | Driver cost issues |
|---|---|---|---|---|---|---|
| 1 | High PF SMPS driver | 225 V | 0.5 W | 80 mA | 18 W | |
| 2 | EM shunt switch | 120 V | 4 W | 300 mA | 18 W | |
| 3 | High PF SMPS driver | 198 V | 2 W | 220 mA | 45 W | |
| 4 | Double-ended input with pin safety | 0 V | 0.5 W | 80 mA | 18 W | Additional pin safety cost |
| 5 | Driver split into two in series | 115 V | 0.5 W | 80 mA | 18 W | |

Option 1 of a high power factor (PF) SMPS (Switch Mode Power Supply) driver is very popular in the market. The pin voltage (~225V) is not appropriate for tombstone connectors with a 2 mm creepage distance.

Option 2 is a shunt switch driver which periodically short-circuits the input in order to reduce the lamp power. The lamp power is regulated with the duty cycle of the shunt switch. This solution results in a high ballast loss and is not desired for this reason. Furthermore, this circuit is not suitable to work on direct mains.

Figure 5:
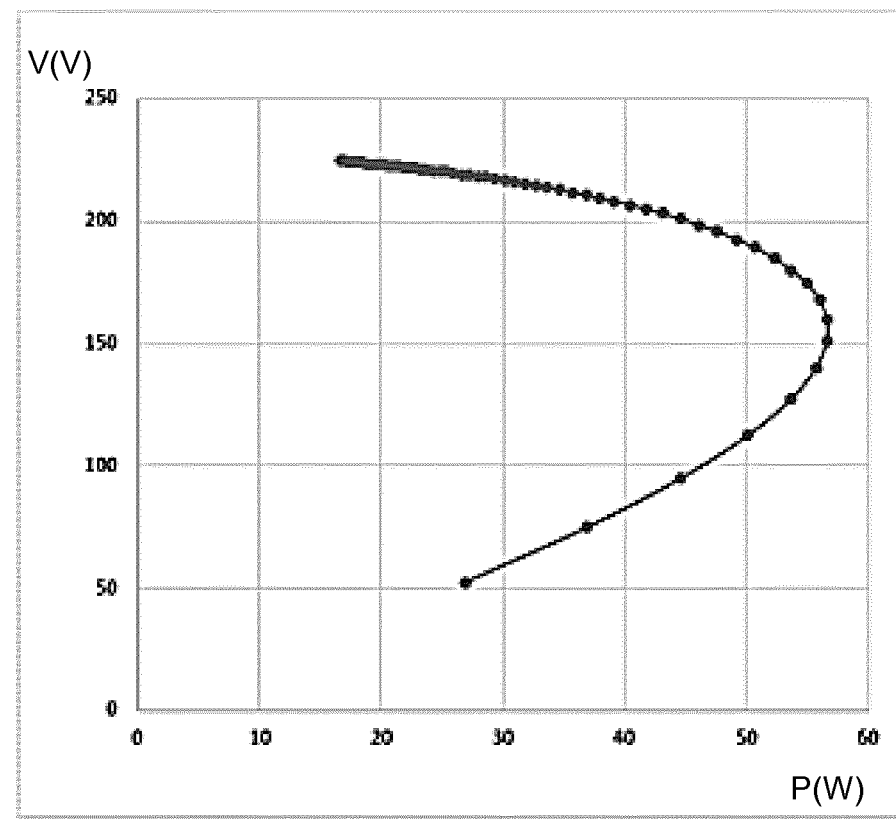
FIG. 5 shows the relationship between lamp voltage and power for a switch mode power supply.

Option 3 is to force the SMPS to reduce the input voltage. For a SMPS driver, the relationship between lamp voltage and power is shown in FIG. 5, which shows the voltage V versus power P. If the input voltage is reduced to 194V, the lamp has to increase the input current significantly in order to create a larger drop over the electromagnetic ballast. The lamp power has to increase dramatically (even higher than the fluorescent lamps), which is not desired.

Option 4 is to make a double-ended input with the two pins at each end shorted. One end is the live pin and the other end is the neutral pin. The pin voltage becomes zero. However, this requires a pin safety solution to limit the pin leakage. The pin safety solution can be mechanical, electro-mechanical or electrical, but is expensive.

Figure 6:
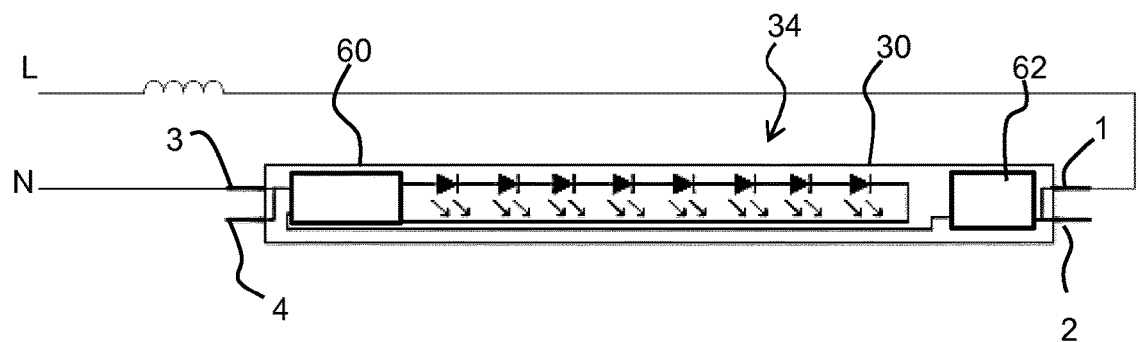
FIG. 6 shows a lamp with the pins at each end shorted.

FIG. 6 shows this option, in which there is a driver 60 at one end of the tubular lamp 30 and the required pin safety mechanism 62 at the other end.

The invention is summarized by option 5, with two drivers in series.

Figure 7:
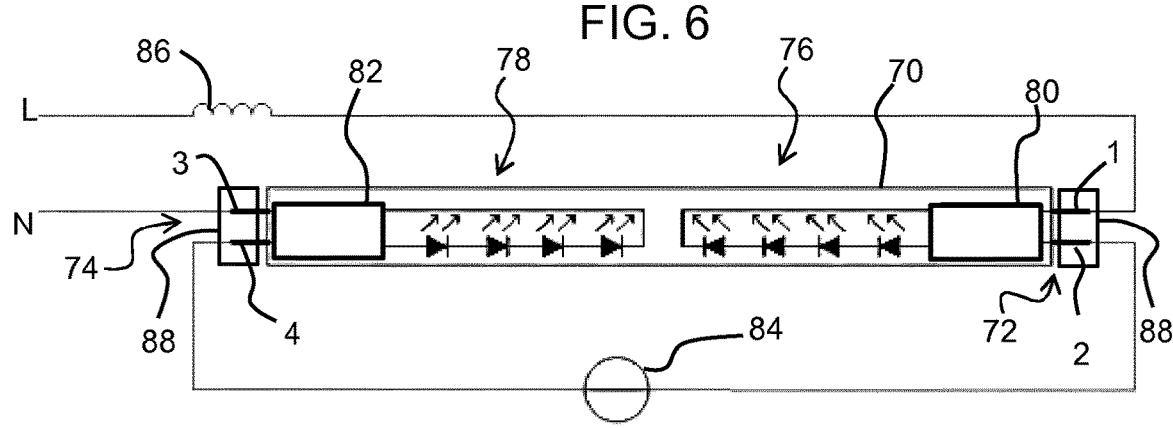
FIG. 7 shows the solution of the invention with two drivers in series.

FIG. 7 shows this solution. It comprises a tubular solid state lamp 70, comprising a first pair 72 of connection pins 1,2 at one end and a second pair 74 of connection pins 3,4 at the other end. The solid state light source arrangement comprises a first section 76 and a second section 78. These are independent sections with no electrical connections between them.

A first driver 80 is electrically coupled to the first pair 72 of connection pins and is connected to the first section 76 of the solid state light source arrangement for driving the first section. A second driver 82 is electrically coupled to the second pair 74 of connection pins and connected to the second section 78 of the solid state light source arrangement for driving the second section.

The two drivers are externally connected in series so that the mains voltage is shared between them. The split is preferably identical, so that the two drivers are identical and the LED string is split into two equal halves. As a result, each driver takes about half of the mains voltage (about 115V), which is safe to operate with a 2 mm creepage lamp holder.

The external connection is between one pin 2 of the first pair 72 of connection pins and one pin 4 of the second pair 74 of connection pins. This implements the series connection between the pairs of pins at each end, thereby placing the two drivers in series. The external interconnection can be provided by a fluorescent tube luminaire housing, a fluorescent luminaire. The interconnection can then be done via the existing wiring of the fluorescent luminaire. Upon correct insertion of the tubular solid state lamp, the series connection between the first driver 80 and the second driver 82 is made.

The tubular lamp 70 connects to an existing fluorescent tube luminaire housing. This has end connectors 88 for example each of which comprises a G13 or G5 lamp holder.

Each end connector for example has a creepage distance of between 2 mm and 2.5 mm.

In the example of FIG. 7, the interconnection comprises a dummy starter 84. This is for connection to an electromagnetic fluorescent tube ballast 86.

Thus, in FIG. 7, there is a series connection from the external live terminal L, through the electromagnetic ballast 86, through the first driver 80, through the dummy starter 84 and through the second driver 82 to the external neutral terminal N. Because the dummy starter is external, pin safety is ensured, with no internal connections between the ends.

One end connector 88 has a terminal for connection to a live terminal L and the other connector has a terminal for connection to a neutral terminal N. The other two end connector terminals are connected by the dummy starter.

Figure 8:
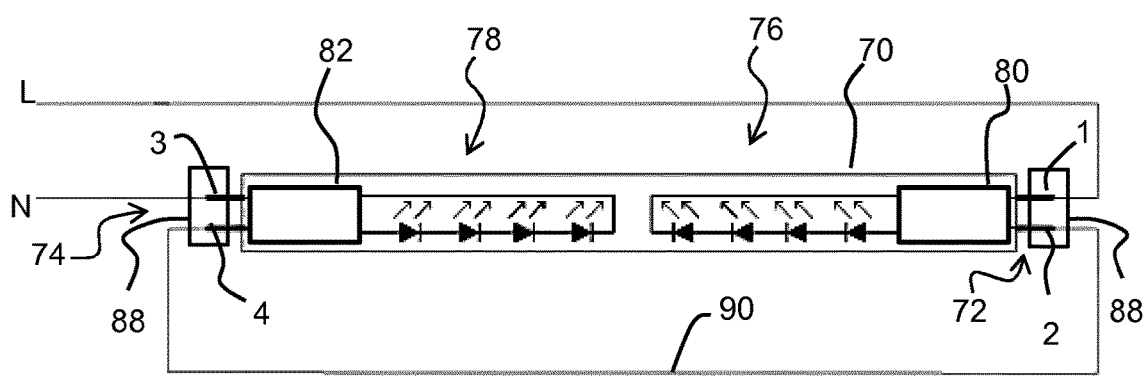
FIG. 8 shows the same tube design as FIG. 7 arranged for direct connection to the mains.

In the example of FIG. 8, the same tube design is used, but the interconnection comprises a shorting wire 90. This is for direct connection to the mains. Thus, in FIG. 8, there is a series connection from the external live terminal L, through the first driver 80, through the shorting wire 90 and through the second driver 82 to the external neutral terminal. Because the shorting wire is external, pin safety is ensured, with no internal connections between the ends.

One end connector again has a terminal for connection to live terminal L and the other end connector has terminal for connection to a neutral terminal N. The other two terminals are connected by the shorting wire.

The first and second drivers may each comprise a switch mode power supply. They may for example comprise buck, boost or flyback converters. They are preferably operated with open loop control. The configuration of the invention, with two drivers in series sharing the mains input voltage, may be implemented with any known driver technology. The first and second drivers may instead each comprise a linear driver, arranged to provide stable operation in series.

Open loop control is desired because when the drivers are connected in series a closed loop control system may lead to unbalanced input between the two drivers.

The invention provides a lighting tube which is EM ballast compatible but also suitable for direct mains driving. The solution addresses safety issues with existing 2 mm creepage lamp holders.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A tubular solid state lamp for connecting to a fluorescent luminaire and for direct connecting with a mains voltage, the tubular solid state lamp comprising:
    a first pair of connection pins at one end of the tubular solid state lamp and a second pair of connection pins at the other end of the tubular solid state lamp;
    a solid state light source arrangement comprising a first section and a second section;
    a first driver electrically coupled to the first pair of connection pins and connected to the first section of the solid state light source arrangement for driving the first section; and
    a second driver electrically coupled to the second pair of connection pins and connected to the second section of the solid state light source arrangement for driving the second section, wherein the first section and the second section have no electric connections between them and wherein the first driver and the second driver are externally interconnected in series so that the mains voltage is shared between them, wherein an external interconnection is provided by the fluorescent luminaire.

2. A tubular solid state lamp as claimed in claim 1, wherein the first and second drivers each comprise a switch mode power supply.

3. A tubular solid state lamp as claimed in claim 1, wherein the first and second drivers each comprise a linear driver.

4. A tubular solid state lamp as claimed in claim 1, wherein the interconnection comprises a dummy starter.

5. A tubular solid state lamp as claimed in claim 1, wherein the interconnection comprises a shorting wire.

6. A lighting installation for use in a fluorescent luminaire, comprising:
    a fluorescent tube lighting driver comprising an electromagnetic ballast and first and second end connectors, each end connector comprising a pair of connection terminals; and
    a tubular solid state lamp as claimed in claim 1 connected between the first and second end connectors.

7. A lighting installation as claimed in claim 6, wherein each end connector comprises a G13 or G5 lamp holder.

8. A lighting installation as claimed in claim 6 wherein each end connector has creepage distance of between 2 mm and 2.5 mm.

9. A lighting installation as claimed in claim 6, wherein the end connectors define a live terminal (L) in one end connector and a neutral terminal (N) in the other end connector and wherein the other two terminals are connected by a dummy starter forming the external interconnection.

10. A lighting installation for use in a fluorescent luminaire, comprising:
    first and second end connectors, each end connector comprising a pair of connection terminals; and
    a tubular solid state lamp as claimed in claim 1 connected between the first and second end connectors,
    wherein the end connectors define a live terminal (L) in one end connector and a neutral terminal (N) in the other end connector and wherein the other two terminals are connected by a shorting wire forming the external interconnection.

11. A lighting installation as claimed in claim 10, wherein each end connector comprises a G13 or G5 lamp holder.

12. A lighting installation as claimed in claim 10 wherein each end connector has creepage distance of between 2 mm and 2.5 mm.

* * * * *